United States Patent Office 2,938,994
Patented May 31, 1960

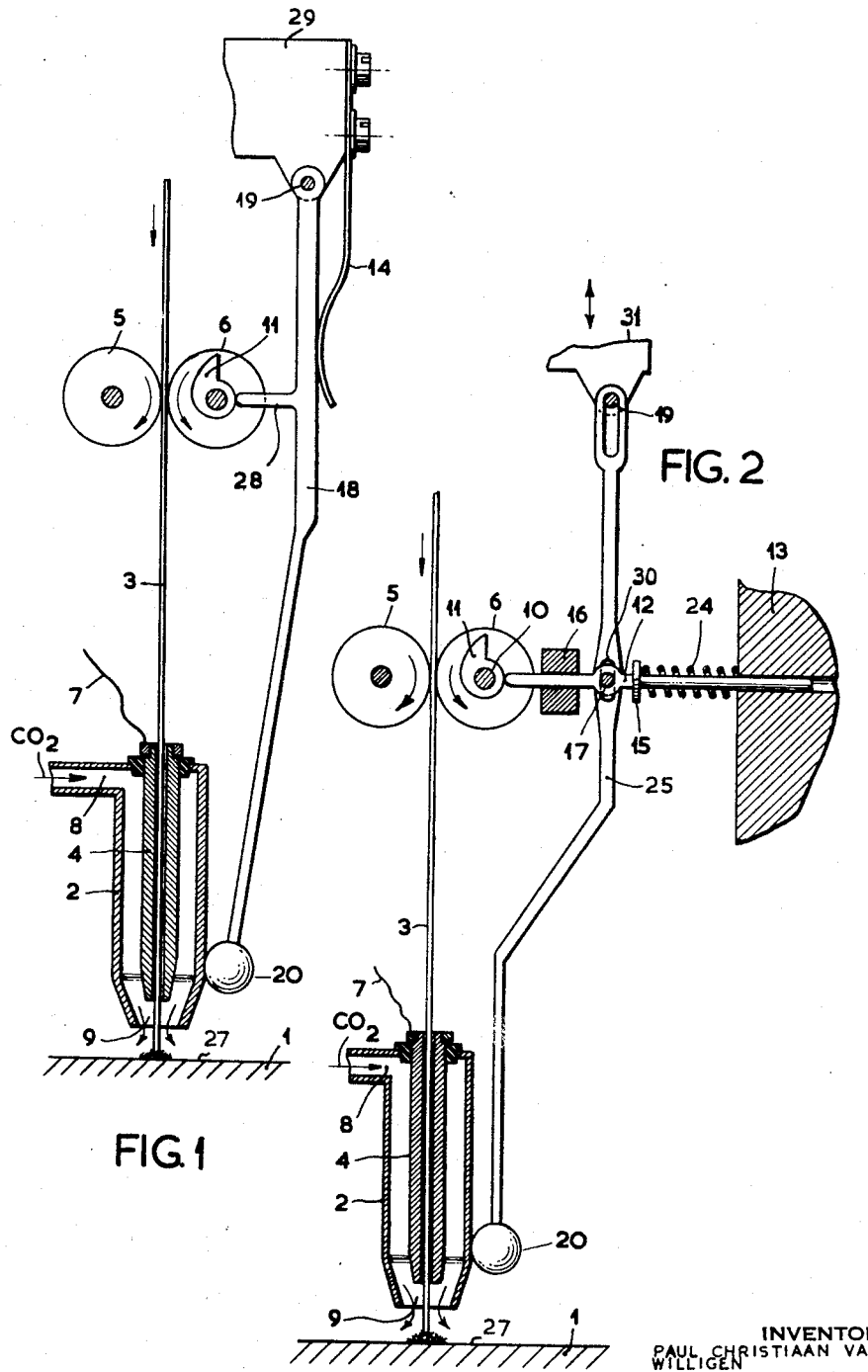

2,938,994
ELECTRIC ARC WELDING APPARATUS

Paul Christiaan van der Willigen, Leon Frits Defize, and Jan Anthonie van Bergen, all of Eindhoven, Netherlands, assignors to North American Philips Company, Inc., New York, N.Y., a corporation of Delaware Filed Mar. 2, 1959, Ser. No. 796,389

Claims priority, application Netherlands Mar. 1, 1958

4 Claims. (Cl. 219—74)

Our invention relates to electric arc welding apparatus in which the arc is shielded by a protective gas, such as $CO_2$, which passes through a nozzle or head surrounding the welding electrode.

While not limited thereto, the apparatus according to invention is particularly suitable for use in connection with welding of the type described in U.S. Patent 2,824,948 and will be described in this connection. In the method of this patent, non-deoxidized or semi-deoxidized steel is welded in a protective atmosphere of substantially pure $CO_2$ using uncoated electrode wire consisting of iron with at least 0.3% by weight of Mn, and at least 0.3% by weight of a strongly-reducing material, such as silicon and titanium. During the welding the electrode is moved over the work piece, either manually or by a suitable mechanism, and at the same time the welding electrode is continuously supplied. The $CO_2$ is supplied to a nozzle or head surrounding the end of the electrode wire and passes out through an opening at the welding point.

We have found that considerable difficulty is encountered when welding in the above manner due to the fact that small particles of the welding material deposit on the inner surface of the nozzle in the vicinity of the outlet opening. These particles form a ridge which increases in size so rapidly that it becomes necessary to stop the welding machine and remove the ridge after a weld of several feet has been made. If the welding is continued too long, this ridge may become so large as to restrict the supply of $CO_2$ from the outlet opening and seriously affect the quality of the weld. This difficulty makes it necessary for the welder to continuously supervise the work, and also results in frequent interruptions of the work.

It has been suggested to overcome the above difficulties by applying a coating of a liquid containing silicon upon the inner surface of the nozzle. However, this did not overcome the difficulty and was a time-consuming operation.

The main objective of our invention is to overcome the above difficulties and provide a welding apparatus which can be used continuously without supervision by the welder. For this purpose we provide means including a massive body to cause an impact upon at least a portion of the wall of said nozzle to thereby prevent the formation of welding material on the surface thereof.

We prefer to produce the vibrations by the impact of a massive body which is forced against the nozzle by a spring and withdrawn by means of a suitable cam arrangement. The speed of the vibrations or the impacts is preferably co-related with the speed at which the welding electrode or wire is supplied to the nozzle, and for this purpose the cam-like arrangement may be driven by the same means which supply the welding wire to the nozzle.

In order that the invention may be clearly understood and readily carried into effect, we shall describe the same in more detail in reference to the accompanying drawing, in which—

Fig. 1 is a partly-sectionalized side view of a portion of a welding apparatus embodying the invention, and Fig. 2 is a side view section of a portion of a welding apparatus according to another embodiment of the invention.

The welding apparatus shown in Figure 1 comprises a nozzle or head 2 located above a work piece 1 and having an inlet opening 8 and an outlet opening 9 through which a protective gas, such as $CO_2$, passes in the direction shown by arrows. A welding wire 3, which may be of the composition referred to above, is moved in the direction of the arrow by two rollers 5 and 6 driven in the direction of the arrow by suitable means, such as an electric motor (not shown). Rollers 5 and 6 are preferably provided with a toughened or knurled surface in order to positively drive the wire 3. Welding current is supplied from a suitable source (not shown) through a wire 27 connected to work piece 1 and a wire 7 attached to a metal contact member 4 insulatingly mounted on nozzle 2.

In accordance with the invention a portion of the wall of nozzle 2 is vibrated by the impact produced by a metal ball 20 secured to one end of a lever 18 whose other end is pivoted at 19 to a support 29. The ball 20 is urged toward nozzle 2 by means of a suitable leaf spring 14 secured to support 29 and is moved away from nozzle 2 by a cam 11 fixedly secured to roller 6 and engaging a projection 28 on rod 18.

The apparatus shown in Figure 2 is in many respects similar to that of Figure 1 and has the same parts indicated by the same reference numerals. In Figure 2 the ball 20 is secured to the end of a lever 25 having its other end pivoted at 19 to an adjustable support 31 and provided with a slot 30. Lever 25 is actuated by means of a rod 12 guided by fixed supports 13 and 16. Rod 12 has one end engaging cam 11 and is provided with a pin 17 which engages slot 30. The force necessary to produce the desired amount of impact of ball 20 on nozzle 2 is obtained by means of a compression spring 24 positioned between support 13 and a collar 15 secured to rod 12.

The stroke of ball 20 and thus the amount of impact upon nozzle 2 may be adjusted by moving support 31 in the direction indicated by the arrow, thereby changing the length of the distance between pin 17 and pivot point 19.

Numerous other mechanical means may, of course be employed to vibrate nozzle 2. It may also be effected electromagnetically. For example, the ball 20 may be driven by an electro-magnetic vibrator, in which case it would be driven at a smaller amplitude and higher frequency than when driven mechanically, such as illustrated. We have found that the best results are obtained when the impacts are at a relatively low frequency and are increased with an increase in the speed at which the electrode wire is supplied.

While we have described our invention in connection with specific examples, we do not desire to be limited thereto as obvious modifications will readily present themselves to one skilled in this art.

What is claimed is:

1. An electric arc welding apparatus comprising a nozzle forming a chamber having an inlet opening and an outlet opening for a protective gas, means to supply an electrode to said nozzle in the vicinity of said outlet opening during the welding operation, and means to prevent the formation of welding material upon the surface of the nozzle in the vicinity of the outlet opening, said means including a massive body and a driving mechanism to bring the same into impact with said nozzle.

2. An electric arc welding apparatus comprising a nozzle forming a chamber having an inlet opening and an outlet opening for a protective gas, means to supply an electrode to said nozzle during the welding operation, and means to cause periodic impacts upon at least a portion of the wall of said nozzle to thereby prevent the formation of welding material on the surface thereof, said means including a massive body, a spring urging said body against said nozzle and a cam to periodically move said body against said spring.

3. An electric arc welding apparatus comprising a nozzle forming a chamber having an inlet opening and an outlet opening for a protective gas, means to supply an electrode wire to said nozzle during the welding operation, a massive body mounted to impact said nozzle, a spring urging said body against said nozzle, means to displace said body away from said nozzle at a frequency proportional to the speed at which said electrode wire is supplied to said nozzle.

4. An electric arc welding apparatus comprising a nozzle forming a chamber having an inlet opening and an outlet opening for a protective gas, means including a roller to supply an electrode wire to said nozzle during the welding operation, a lever, a massive body mounted on said lever to impact said nozzle, a spring acting upon said lever to urge said body into impact with said nozzle, and a cam mounted on said roller for periodically actuating said lever.

References Cited in the file of this patent

UNITED STATES PATENTS

| 2,211,424 | Halslag | Aug. 13, 1940 |
| 2,833,913 | Bernard | May 6, 1958 |

FOREIGN PATENTS

| 608,270 | Great Britain | Sept. 13, 1948 |